Dec. 5, 1961  R. J. WILLIAMS  3,011,219
METHOD OF FORMING A BALL JOINT UTILIZING A FLUOROCARBON LAYER
Filed April 14, 1958

INVENTOR.
Richard J. Williams
BY
Harness, Dickey & Pierce
ATTORNEYS.

United States Patent Office 3,011,219
Patented Dec. 5, 1961

3,011,219
METHOD OF FORMING A BALL JOINT UTILIZING A FLUOROCARBON LAYER
Richard J. Williams, Birmingham, Mich., assignor to American Metal Products Company, Detroit, Mich., a corporation of Michigan
Filed Apr. 14, 1958, Ser. No. 728,273
5 Claims. (Cl. 18—59)

This invention relates to a method of forming low friction elements, and particularly to a method of forming an element of predetermined surface configuration having a coating of low friction material bonded thereto in a manner to accurately mate with a second element to provide a low friction surface therebetween.

It is well known in the art that Teflon, Kel-F and other fluorocarbons have excellent low friction characteristics and are therefore, desirable for use in bearings, seals and the like. However, a major problem in the use of fluorocarbons for such applications is the difficulty encountered in bonding them to suitable backing elements since they are substantially non-bondable to other materials.

Recently several methods have been developed for bonding less expensive, non-woven sheets or coatings of Teflon and similar fluorocarbons. Teflon being used by way of example only, directly to other materials such as metal to provide a protective, corrosion-resistant coating. Some of these methods are completely disclosed in the patents to Pierre R. Welch, No. 2,777,783, Richard A. Smith, No. 2,774,704, and A. Panagrossi et al., No. 2,705,691, and the subject matter of these patents is incorporated herein just as fully as if they were completely reproduced herein.

In a recently developed method of utilizing the teaching of the aforesaid Welch patent for bearing construction, layers of a bondable carrier material containing increasing quantities of Teflon dispersion, for example, are coated and baked on the surface of a ball with the final coating containing 90% or more of Teflon. The Teflon of each layer fuses together and is interlocked and physically retained by the carrier material which will bond to the metal of the ball. In this manner, the ball is provided with a low friction surface and a suitable backing element can be molded thereabout and retained by a housing to provide a ball joint with a bearing surface between the Teflon and backing element.

However, in coating the ball with multiple layers in this manner, it is difficult to obtain a final surface which is a true sphere even though the ball is machined with the highest precision to form a substantially true spherical surface. It is, of course, apparent that any deviation from true roundness in the final Teflon surface is detrimental to the bearing relationship between the Teflon surface and the backing element molded about the ball.

The above problem has been effectively eliminated by the present invention by employing a diametrically opposed approach which is completely contrary to the teaching of the prior art. In accordance with the present invention, the order of application of the coatings is reversed so that the coating of Teflon is applied directly to the surface of the ball by spraying, brushing, dipping, or any suitable means. The Teflon is then sintered to form a solid coating that accurately conforms to the surface of the ball and is mechanically retained thereon since it encircles or overlaps the major diameter of the ball. The remaining coatings are then applied in reverse order and heated as taught by the Welch patent, and a backing element molded thereabout which bonds to the outer layer. A sharp break-away force is applied between the backing element and the ball to free the Teflon from the surface of the ball.

In this manner, an extremely accurate, durable and high quality bearing surface is formed wherein the Teflon is molded or mated directly to the surface of the ball to provide the highly desirable area contact, and eliminate the problem of maintaining diameters between the ball and backing element. As is well known, very accurate spherical or cylindrical surfaces can be precision machined but it is extremely difficult to maintain the diameters of two spherical surfaces within tolerances which will permit them to be accurately engaged with one another in a bearing relationship.

Of course, as stated previously, there are other known methods for bonding Teflon and other substantially non-bondable materials to backing elements such as the teaching in the aforesaid patents to Panagrossi et al. and Smith, wherein a fluorocarbon adhesive material is employed, and a process recently developed by E. I. du Pont de Nemours & Co. of Wilmington, Delaware. The latter process briefly comprises treating the surface of Teflon for example, in a manner that enables the Teflon to be bonded to other materials by conventional bonding materials. When any of these latter teachings are employed for bonding a backing element to the low friction material, the low friction material need not be applied in a dispersion form and then sintered. For example, a film or coating of Teflon could also be applied to the surface of an element by forming a Teflon sheet about the element or molding Teflon powder about the element and applying the necessary heat to sinter the Teflon so that it is mechanically locked about and conforms to the element.

It is also apparent that when a rubber or other resilient backing element is employed, the present invention lends itself for use as an exceptionally fine seal for rotating or reciprocating shafts, and a variety of other seal applications.

The main objects of the invention are: to provide a method of forming a low friction element; to provide a backing element having a thin layer of low friction material bonded to the face thereof in a manner to accurately mate to an element having a surface of predetermined configuration; to provide a method of coating a relatively thin film of fluorocarbon material to a surface of predetermined configuration and bonding a backing element to the fluorocarbon material; to provide a method of coating a relatively thin film of low friction material to a surface of predetermined configuration and bonding a backing element to the low friction material; to provide a method for accurately conforming a thin film of non-bondable low friction material to a surface of predetermined configuration and affixing a backing element to the non-bondable low friction material by means of intermediate layers comprised of a mixture of a material that will bond to the backing element with varying amounts of the non-bondable low friction material dispersed therein; and to provide a bearing construction having extremely accurate area engagement between the bearing surfaces which is relatively inexpensive to manufacture, and rugged and durable in use.

Other objects and features of novelty of the invention will be specifically pointed out or otherwise become apparent when referring, for a better understanding of the invention, to the following description taken in conjunction with the accompanying drawing, wherein.

Figure 1:
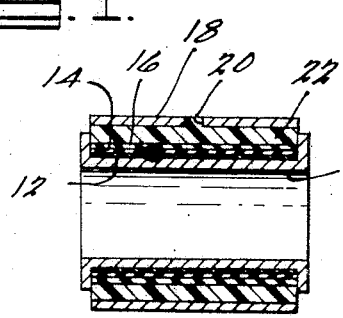
FIGURE 1 is a sectional view of a bearing element embodying features of the invention.

Referring to FIG. 1, one embodiment of the invention is comprised of a sleeve 10 having a relatively thin coating 12 of non-bondable low friction material coated on the cylindrical surface thereof to provide a bearing surface. The material of the coating 12 can be coated to the desired thickness. It need only be and it can be less than one thousandths of an inch thick. It is shown as somewhat enlarged in thickness in the drawing for the sake of clarity. The coating can be any suitable fluorocarbon resin, such as Teflon or Kel-F which is substantially non-bondable to other materials, however, by way of example only, it will hereinafter be referred to as a coating of Teflon.

To form the bearing construction, the exact reverse of the process disclosed in the aforesaid Welch patent is employed. In direct contrast with the teaching of Welch, the coating having the most Teflon dispersed in a suitable resin bonding material is applied to the bushing 10 as the first coat by spraying, brushing, dipping, or any suitable means. The Teflon is then sintered or flamed out so that it fuses together to form the solid coating 12 which is mechanically locked on the sleeve. An intermediate coating 14 is then applied to the Teflon coating 12 which, in accordance with the Welch teaching, is comprised of the aforesaid suitable resin bonding material having preferably 60% Teflon particles dispersed therein. A third coating 16 is applied to the intermediate layer which is comprised of the aforesaid resin material having approximately 20% or less Teflon particles dispersed therein. Each of the coatings is sintered or flamed out as taught by Welch to insure that the resin bonding material of each layer forms one homogeneous mass, and that the Teflon particles in each of the layers which contact each other, including those at the surfaces of the coating, are fused together. In this manner, it is believed that the Teflon coating 12 is physically anchored to the resin bonding material of the intermediate and third coatings 14 and 16 by the interlocked lattice work of fused Teflon particles. Reference is made to the Welch patent for a complete description of the detailed method for bonding these layers together including the temperatures employed and the sequence of heating.

A suitable cylindrical housing 18 having an aperture 20 therein is then disposed about the third coating 16 and a hardenable backing material 22 which will bond to the resin bonding material of the layers 14 and 16 as well as to the housing 18 is injected through the aperture 20 under heat and pressure so that it fills the entire space between the housing and the third coating 16 and exerts a predetermined pressure thereon to further conform the coatings to the sleeve 10. Of course, it is apparent that the hardenable backing material may be molded about the third coating by other than the injection method, and it is, therefore, to be specifically understood that the invention is not limited to the injection of the hardenable material 22.

By way of example only, the hardenable material can be any material that can be molded about the ball and bonded after hardening as described above, such as polyethylene molding compounds, two being procurable on the market, one under the name of super Dylan, the other under the name of Marlex; phenolic impregnated glass fibrous material procurable in the trade under the name of Durez; and a form of nylon material procurable on the market under the name of Zytel as well as a phenolic and polyethylene impregnated glass fibrous material.

After the material 22 has hardened and bonded both to the housing and to the layer 16, the bearing structure is completed and a sharp break-away force can be applied between the housing 18 and the sleeve 10 to free the Teflon coating 12 from the cylindrical surface of the sleeve. Experience has proved that such a break-away force is necessary when the bearing is constructed as previously described because even highly polished surfaces have small irregularities and Teflon will mate with these irregularities and consequently tend to stick to the sleeve 10. However, once the Teflon is broken away, it forms a very accurately mated and durable low friction bearing surface which does not require any lubrication.

The aforesaid tendency of the Teflon to stick or lock on the surfaces of elements can be used to advantage in forming bearing surfaces for elements wherein the Teflon does not encircle the element so as to be mechanically locked thereto. For example, a portion of the surface of a shaft or ball could be coated with the multiple layers 12, 14 and 16 and backed by the hardenable material 22, or other suitable backing material, and the tendency of the Teflon to stick relied upon to maintain engagement with the surface without a mechanical locking. When the break-away force is applied, the Teflon is freed as before, but since it is not mechanically locked, it can be removed. This construction still provides the accurately mated bearing element with the additional advantage that the bearing can be more easily disassembled when desired.

Figure 2:
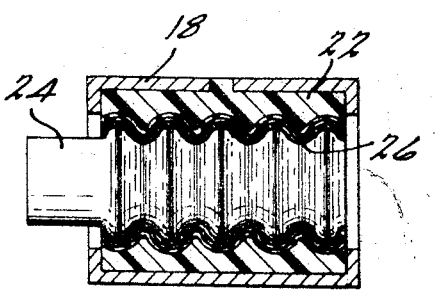
FIG. 2 is a sectional view of a bearing element illustrating another embodiment of the invention.

Referring to FIG. 2, another embodiment of the invention is shown wherein a bearing surface as described in FIG. 1 is applied to a shaft 24 having a plurality of annular grooves 26 therein. The method of construction is exactly as previously described and results in the shaft 24 being rotatably supported in a housing 18 but prevented from moving axially relative thereto by virtue of the annular grooves 26. If desired, a spiral thread can be formed on the shaft 24 instead of the annular grooves 26 and the bearing surface formed in exactly the same manner. This construction provides a running nut with a mating spiral thread having the coating of Teflon on the surface thereof, that can be used in the conventional running nut and lead screw applications to provide a non-lubricating bearing surface free from all backlash.

Figure 3:
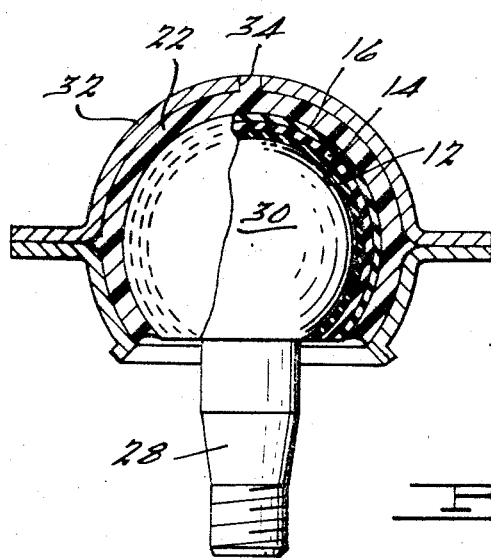
FIG. 3 is a sectional view of a ball joint bearing element illustrating still another modification of the invention.

Referring to FIG. 3, another embodiment of the invention is illustrated wherein the Teflon coating 12, the intermediate coating 14 and the third coating 16 are applied to the surface of a ball 30 on the end of a stud 28 in exactly the same manner as they were applied to the sleeve 10. (As previously explained, the coatings are enlarged for the sake of clarity.) A split housing 32 having an aperture 34 therein, similar to the housing illustrated in the aforesaid application, Serial No. 619,782, is disposed about the ball 30 and the hardenable material 22 is injected through the aperture 34 so as to accurately conform and bond to the layer 16. The hardenable material can be either bonded to the interior wall of the housing 32 by a suitable bonding material, or mechanically fixed relative thereto by providing a roughened wall or projections on the wall to which the hardenable material will conform. After the material 22 is hardened, the break-away force can be applied to the stud 28 to free the layer of Teflon from the surface of the ball 30 to provide a ball joint construction having an accurately conformed Teflon bearing surface.

Figure 4:
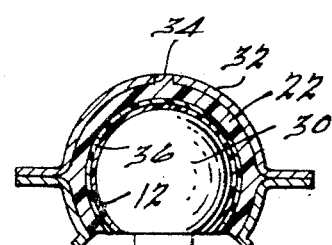
FIG. 4 is a sectional view of a ball joint bearing element illustrating still another modification of the invention.

As previously explained, the present invention is not limited to the teaching of the aforesaid Welch patent for bonding the Teflon or other fluorocarbons to the hardenable material 22. For example, as illustrated in FIG. 4, the Teflon coating 12 may be coated on the surface of the ball in the above-described manner, and a suitable fluorocarbon adhesive 36, as disclosed in the aforesaid patents to Smith and Panagrossi et al., coated thereon. The hardenable material 22 can then be injected into the housing 32 through the aperture 34 as previously described so that it bonds to the fluorocarbon adhesive coating 36 to provide a rigid backing.

Figure 5:
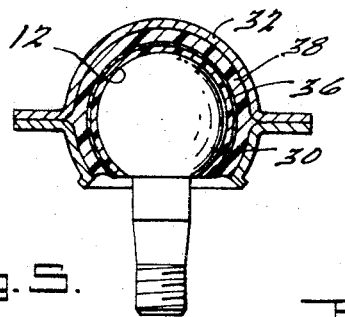
FIG. 5 is a sectional view of a ball joint bearing construction illustrating still another modification of the invention.

Of course, the particular fluorocarbon adhesive 36 selected, in accordance with the teaching of Smith and Panagrossi et al., will depend upon the "Teflon" or other fluorocarbon low friction material being used, as well as the hardenable material 22 that is employed. For example, Panagrossi et al. teaches the bonding of a fluorocarbon resin to rubber by a fluorocarbon adhesive material. Therefore, each of these fluorocarbon materials could be employed which would mean that the hardenable material 22 injected would be rubber. Of course, if rubber is used for the hardenable material 22, it can also be inserted as a preformed rubber boot, rather than injected, and bonded to the coating 36 in accordance with Panagrossi's teaching. Reference is made to FIG. 5 for an example of this wherein the aperture 34 is eliminated and the clamping action of the split housing provides the necessary pressure. Of course, rubber boot 38 is oversized a predetermined amount to provide the desired compression thereof by the split housing 32.

Further, if the hardenable material 22 is a thermosetting material it need not be injected within the housing 32 but also may be preformed and partially cured so that it can be positioned between the housing and the coating 36 as an insert, just as the rubber boot 38 was inserted, and heat and pressure similarly applied thereafter to finally cure, conform and bond it to the coating 36.

Still further, in accordance with the teaching of the patent to Smith, a suitable fluorocarbon adhesive coating 36 can be selected which will bond directly to the material of the housing 32 so that the hardenable material 22 need not necessarily be employed. With this arrangement, the interior surface of the housing would, of course, have to be finished with greater accuracy so that it can be clamped about the coating 36 and bonded thereto to maintain the bearing engagement between the Teflon coating 12 and the surface of the ball. However, it is preferable to inject the hardenable material 22 between the housing and the final coating on the ball since the hardenable material is inexpensive and easy to inject, and will conform to the coating at a predetermined pressure. Consequently, after it hardens, it will exert the desired pressure on the coatings to maintain the bearing relationship and have sufficient rigidity to serve as a backing element.

Since the coatings 12, 14 and 16 and the coating 36 are hardened solid coatings, they will also effectively serve as a barrier to prevent the flow of the hardenable material 22 through to the surface of the ball when the hardenable material is molded thereabout under heat and pressure. However, when the material 22 is injected, it may be advisable to initially inject it rather slowly until it substantially fills the space within the housing 32 and thereafter apply the desired pressure. This may be necessary when the coatings are relatively thin because of the possibility that the material 22 when injected under high pressure may strike the dome of the ball 30 adjacent the aperture 34 with sufficient force to break or abrade the coating and tend to wash or tear it away from the surface of the ball as the material passes around the ball. It is apparent that controlling the initial injection pressure will overcome this, and also that when the coatings are thick or tough enough, this will not occur.

As mentioned previously, the backing material may be bonded directly to the Teflon by conventional bonding materials when the aforesaid Du Pont process is employed for treating the surface of the Teflon. This process is completely described in an Information Bulletin, No. X–75 of the Polychemicals Department of the Du Pont company. The process relates to the treatment of Teflon to provide a cementable surface and is essentially a one-step process, consisting of the immersion of Teflon in a bath of sodium metal in liquid ammonia for a specified period. It is recommended that the Teflon be cleaned thoroughly before immersion to remove grease or other contaminants. This can be done with a solvent such as acetone. After immersion, the treated Teflon is quickly quenched in cold water to remove any residual agents from the treating step.

With regard to the preparation of the treating bath, metallic sodium is dissolved in liquid anhydrous ammonia. The maximum recommended strength of the solution is about 1%. When the sodium is added to liquid ammonia, a characteristic dark blue solution is obtained. Solution of the sodium is quite rapid, but mild stirring is desirable to insure complete solution of the sodium before immersion of the Teflon. In the preparation of the bath, as well as, during the treatment, it is absolutely essential that moisture be excluded. Otherwise, poor bonds will be produced in the finished product. In laboratory work it has been found that moisture can be excluded satisfactorily by using a temporary protective barrier made of Alathon polyethylene resin (in the form of a film) with positive pressure applied by nitrogen gas.

The volume of solution required will depend upon the amount of Teflon to be treated. However, the volume of solution should be limited to avoid the accumulation of too large a quantity of sodium at one time. The time of immersion of Teflon in the bath is relatively short ranging from one to five seconds.

Stainless steel containers of appropriate size should be used for the treating bath. It is recommended that the height of the container be about 1.5 times the diameter to insure complete blanketing of the liquid with ammonia and nitrogen vapors at all times. This is necessary to exclude moisture from the treating bath. As an added precaution to accomplish this, it is suggested that nitrogen gas also be introduced continuously as a blanket near the surface of the bath. As the Teflon emerges from the bath, the residual ammonia volatilizes after a short exposure to the air. However, it is preferred that the residual sodium hydroxide and treating solution be removed by a cold water quench. This is accomplished by a quick dip of the treated Teflon into a large bath of cold water. The Teflon is removed from the quenched bath immediately and dried.

After treatment, the Teflon has a dark brown metallic appearance. On standing in air, the metallic luster disappears and a dull dark brown color remains. The treated surface can then be cemented to a variety of backing materials with conventional bonding agents.

When the Du Pont process is employed the coating 12, in this case Teflon, is first applied to the surface of the ball of a stud and ball, for example, as previously described. The exposed outer surface of the Teflon is then subjected to the above-described Du Pont immersion treatment to provide a suitable bonding surface for the otherwise unbondable material.

After the Teflon surface has been treated, a coating or barrier coating is preferably bonded to the treated surface so as to further insure than when an injected backing material is used, it can be injected against and bonded to the barrier coating without rupturing the Teflon film.

It is possible, depending upon the thickness or strength of the Teflon coating, to eliminate the barrier coating and to inject the backing material directly against the treated Teflon surface and bond it directly thereto. In either case, the movable portion of the bearing, in this example the ball stud, can then be broken free after the unit has been completely molded with the treated Teflon surface bonded to the backing material and the ball surface riding on the inner Teflon surface which is not treated.

Figure 6:
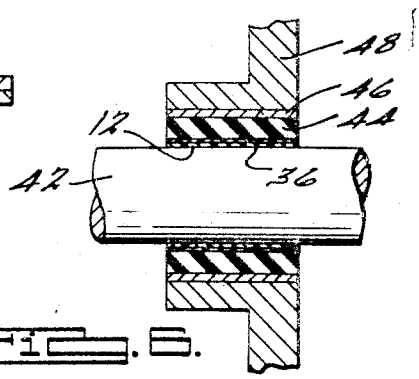
FIG. 6 is a broken sectional view of a seal construction for a reciprocating shaft embodying features of the invention.

The present invention also lends itself to seal applications, as illustrated in FIG. 6, wherein the coating 12 of Teflon or the like, and the fluorocarbon adhesive coating 36 are applied to the surface of a reciprocating shaft 42 and hardened so that they are mechanically retained thereon. A rubber backing material 44, or other suitable resilient material, can be clamped by a retaining ring 46 so as to be compressed with a predetermined pressure against the low friction coating 40 and bonded thereto as previously described with regard to FIG. 5. The ring 46 may then be fixed within a suitable aperture in a body 48, such as an air or hydraulic cylinder, to complete the structure. In this manner, a very effective and inexpensive seal is provided having a low friction surface which intimately engages the surface of the shaft so as to completely seal against the escape of gases and fluids, or the like.

In each of the embodiments described above, it is preferable that the surface of the shaft, ball or other element engaged by the low friction material be rust proofed in any conventional manner, such as by providing a stainless steel surface coating or a flash of chrome. Further, although the invention has been described with either shafts or balls as the elements with which the low friction material engages, it is readily apparent that the present invention lends itself for use with elements of many other configurations, including flat or straight elements such as guideways for lathes and other machine tools.

What is claimed is:

1. The method of constructing a low friction element, which includes the steps of, applying a first coating of substantially non-bondable low friction material mixed with a small amount of bondable material to a body of predetermined surface configuration, bonding at least one coating of a mixture of said low friction material and increasing amounts of said bondable material to said first coating, and applying a backing material about the outermost coating to accurately conform all of the coatings to said surface and bond to the outermost coating whereby the first coating material is rigidly retained against movement relative to the backing material and forms a bearing surface in intimate engagement with said body.

2. The method of constructing a ball and socket joint which includes the steps of, applying a first coating of fluorocarbon material to the ball of the joint so that said coating material accurately conforms to said surface of the ball after it hardens, bonding a second coating of fluorocarbon adhesive material to said first coating material, positioning a housing about said element, and providing a hardenable backing material within said housing which is secured thereto and to the fluorocarbon adhesive coating material.

3. The subject matter as claimed in claim 2 wherein said fluorocarbon adhesive material comprises a mixture of said fluorocarbon material and a material that will bond with said hardenable material.

4. The method of constructing a low friction element, which includes the steps of, applying a coating of substantially non-bondable low friction material to a member having a predetermined surface configuration so that said coating material accurately conforms to said surface after it is hardened and is movable thereon, immersing the low friction material in a bath of reagents, to treat the outermost surface thereof in a manner to provide a cementable surface, and bonding a backing material to said cementable surface.

5. The method of constructing a ball and socket joint, which includes the steps of, applying a coating of substantially non-bondable low friction material to the ball of the joint to have it accurately conform to the surface of the ball after the coating is hardened, immersing the assembly in a bath of reagents, to treat the outermost surface of the low friction material in a manner to provide a cementable surface, and bonding a hardenable backing material onto the cementable surface.

References Cited in the file of this patent

UNITED STATES PATENTS

| | | |
|---|---|---|
| 1,155,495 | Leake | Oct. 5, 1915 |
| 2,705,691 | Panagrossi | Apr. 5, 1955 |
| 2,774,704 | Smith | Dec. 18, 1956 |
| 2,777,783 | Welch | Jan. 15, 1957 |
| 2,807,510 | Schubert | Sept. 14, 1957 |
| 2,815,253 | Spriggs | Dec. 3, 1957 |
| 2,833,686 | Sandt | May 6, 1958 |
| 2,885,248 | White | May 5, 1959 |
| 2,907,612 | White | Oct. 6, 1959 |
| 2,919,150 | Baker | Dec. 29, 1959 |